March 29, 1960    S. WEISMAN ET AL    2,930,396
FLOOD CONTROL MEANS
Filed Aug. 20, 1956
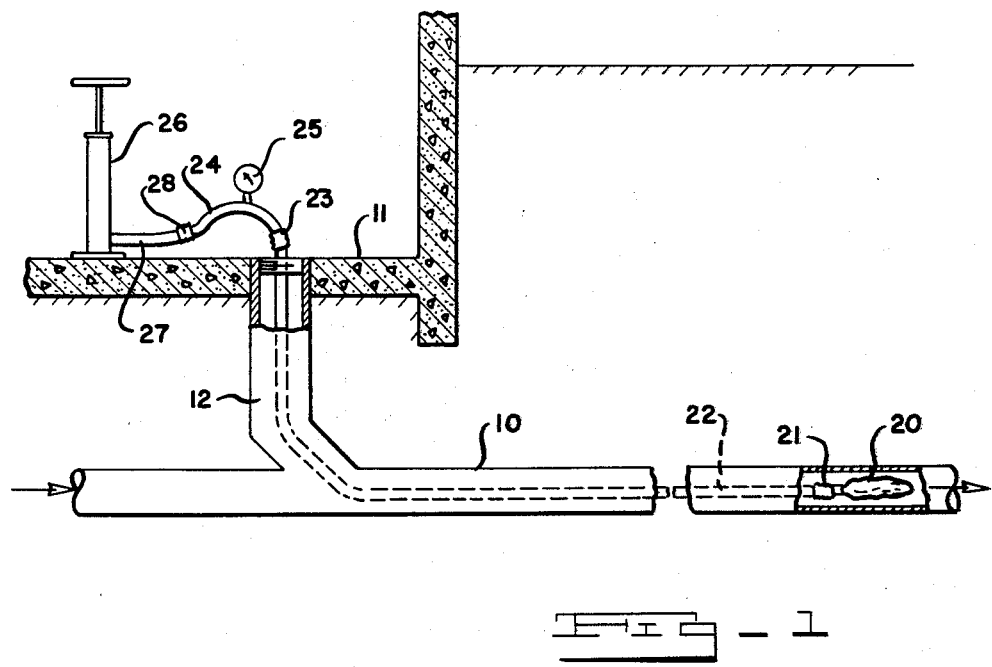
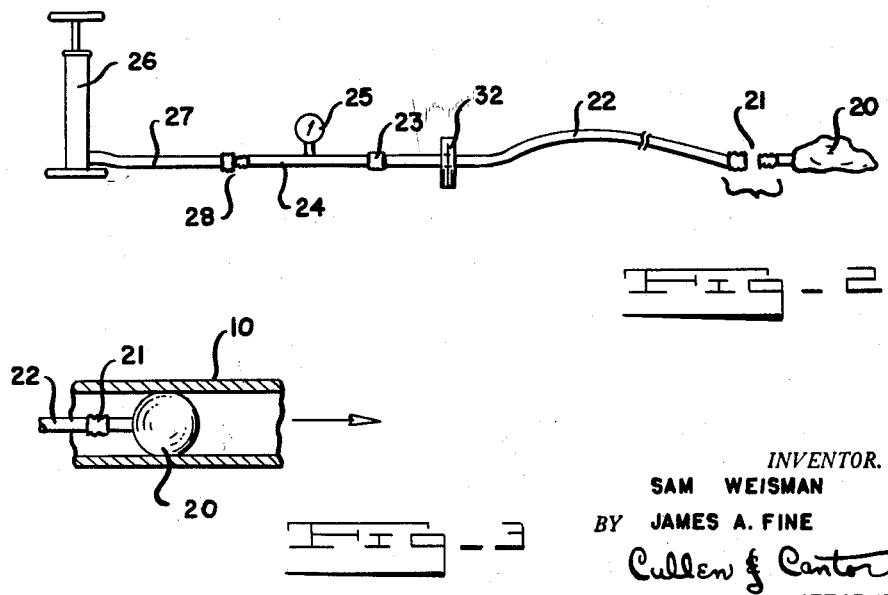
INVENTOR.
SAM WEISMAN
BY JAMES A. FINE
Cullen & Canton
ATTORNEYS

United States Patent Office 2,930,396
Patented Mar. 29, 1960

2,930,396

FLOOD CONTROL MEANS

Sam Weisman and James A. Fine, Detroit, Mich., assignors to S.D.M. Enterprises, Inc., Detroit, Mich., a corporation of Michigan Application August 20, 1956, Serial No. 605,150

1 Claim. (Cl. 137—357)

This application relates to flood control means and particularly to an inexpensive flood control means which can easily and quickly be used by a householder for preventing floods in basements due to sewer backflow.

A particular object of the present invention is to provide a means which can be used by the average householder without requiring the services of a plumber or electrician or any other skilled tradesman and which can be used by even the most inexperienced of householders.

A still further object of the present invention is to provide a device which is easy to install and once installed is ready for instant use without requiring special skill and is available and useful to even the most inexperienced of householders.

For an understanding of the present invention, reference should be had to the appended drawing.

In this drawing:

Fig. 1 shows a sewer line with the device installed and in use, ready for emergency manipulation to prevent sewer backflow;

Fig. 2 shows the device per se;

Fig. 3 shows a portion of the device in condition to prevent backflow.

Referring to the drawing, it will be observed that Fig. 1 shows a sewer line 10 beneath a basement floor 11. A riser 12, connected to the sewer line, is provided with an open upper end which is normally closed by a conventional threaded clean-out cap not shown.

The device of the invention is shown installed in the sewer line ready for use and includes an inflatable hollow closure means such as a hollow, rubber bag or ball 20, the latter having an opening provided with a thread enabling it to be coupled by a threaded coupling at 21 to one end of a long, somewhat flexible hose line 22. This hose line, while flexible enough to permit itself and the closure means 20 to be fished or threaded down the sewer line through the riser 12 is nevertheless stiff enough to resist being buckled under back pressure from a sewer during and after the time the device in installed. Conventional garden hoses, particularly of the rather heavy rubber wall type, have been found useful for this purpose.

The other end of the hose, opposite from the coupling 21, is also provided with a threaded coupling 23 enabling the hose to be coupled either to a short tube 24 having a pressure gage 25 thereon, or to a tube 27 forming part of a pump 26, as desired.

Both ends of the tube 24 have threaded couplings, one at 23 for coupling to the hose 22 and the other at 28 for coupling to a conventional hand pump 26 such as the ordinary tire pump which has a flexible connection tube 27 and which is conventional in style, with appropriate check valves, etc.

The pressure gage 25 and its tube 24 may be omitted if found unnecessary and the hose coupled directly to the pump tube 27 but it is preferable to employ a pressure gage 25 for safety's sake.

The combination includes not only the foregoing parts but also what is extremely important, a clean-out cap 32 having a central opening through which the hose 22 passes whereby the cap and the hose are relatively slidable but with the parts so formed that the cap 32 is non-removable with respect to the hose 22. For example, the central hole in the cap 32 may be small enough so that it will not pass beyond the threaded couplings at both ends of the hose and in this way, the hose and the cap are relatively non-removable. Hose 22 and cap 32 may be assembled before a coupling 21 or 23 is applied.

The foregoing parts, it will be observed, including the closure means 20, the hose 22, cap 32, and the pump 26, with or without the gage 25 form a combination which can inexpensively be packaged and sold and, once assembled by the householder merely by the use of the threaded couplings, is ready for installation in a system.

When the householder removes the parts from the merchandising package containing them, it is a simple matter for him to assemble the parts and install them for use as follows. He will assemble the hose 22 with the closure 20 at one end and with the pump 26 at the other, with or without the gage 25 as the case may be. He will then remove the conventional clean-out cap that is normally provided in the basement floor at the upper end of the riser 12 and put it to one side. He will then fish or thread down the hose 22 with the closure means 20 at the leading end down into the riser 12 and the sewer 10 until cap 32 reaches the upper end of the riser and this is the limit of the fishing or threading down step. When this limit is reached, in view of the predetermined length of the hose 22, he will understand that the closure means 20 has reached a point in the sewer line well remote from the riser 12 and a point where it is safe to close or block off the sewer line by the closure means 20. The householder will then thread the cap 32 down into the riser 12 to close its upper end replacing the conventional cap which is no longer needed and will leave the parts in the position shown in Fig. 1 with the pump on the basement floor, with the pressure gage exposed and with the closure means 20 deflated so as not to interfere with normal sewer flow.

When an emergency arises, as for example when a heavy rainstorm is anticipated or there begin to appear signs of basement flooding, or when the householder leaves the house for a time which, though long enough to contain the possibility of a storm in his absence, is short enough so that ground seepage will not work into his sewer line between the closure means 20 and the riser 12 to cause basement flooding from seepage, the householder can then very quickly and easily close off the sewer line by closure means 20 simply by manipulating the pump 26 until he is sure that closure means 20 has been inflated sufficiently to block off the sewer line at the desired point. The pressure gage 25 may be used to indicate the desired pressure or for safety's sake to indicate a pressure beyond which it is unsafe to pump any further or possibly unnecessary to pump any further.

When the emergency passes, the closure means 20 is permitted to deflate simply by uncoupling the pump from the hose line or by opening a valve in the pump or in any other easy and simple way.

It will be observed that the parts just described form an inexpensive and yet easily usable means for blocking off a sewer line, useful by even the most inexperienced of householders and not requiring the services of any skilled tradesman.

An important factor is the inclusion of a non-removable, but slidable, clean-out cap in the combination which maintains the parts in predetermined and assembled relationship once the parts are installed and at the same time closes off the basement floor opening at the riser 12.

Still another important factor is that the hose 22 is stiff enough to prevent its being buckled under backflow when the closure means is inflated and yet is resilient enough to permit its being threaded down into the sewer line and follow the curvature of such line and pass over obstructions in such line during the installation of the device.

While it is possible to include with the device an automatic arrangement which includes a float in riser 12 which actuates a switch for energizing an automatic pump to replace the hand pump 26, it is preferable in the present view to maintain the parts in their simplest form and thus to include only a hand pump with no float control or automatic system. However, the automatic system may be incorporated if desired without any great difficulty.

Now having described the present invention, reference should be had to the claim which follows.

We claim:

The combination of a structure having a basement floor, a sewer line extending below and beyond said basement floor, said sewer line being provided with a clean out riser extending through said floor, a device for blocking off the sewer line at a point sufficiently remote from the riser and beyond the basement floor where hydrostatic pressure within and due to fluids carried by the sewer line, in the event of bursting of the sewer line at that point, will not effect the basement floor; said device comprising an inflatable hollow closure means having an opening connected by a coupling to one end of a long somewhat flexible hose line of sufficient length for inserting and holding the closure means in the sewer line at said point, the hose line being sufficiently stiff to resist buckling under back pressure from a flooded sewer and also to hold the deflated closure normally in its place within the sewer line, the opposite end of the hose line being connected by a coupling means to a pump means, and a closure cap for the basement floor opening positioned on the hose with the hose passing slidably through an opening formed in said closure cap, and the closure cap being held non-removably upon the hose by the closure coupling at one end and the pump coupling at the other end, and a fastening means formed on the closure cap for positively interlocking the cap to the upper end of the riser to cover the floor opening, said fastening means consisting of threads formed upon the cap for threadedly engaging with threads formed on the top of the riser at the basement opening, said closure means being of a character that is normally deflated and when deflated is small enough in relation to the diameter of the sewer line so as to permit normal flow through said sewer line, but, when inflated, is large enough to block the sewer line to thereby block the flow of fluid through the sewer line.

References Cited in the file of this patent

UNITED STATES PATENTS

| | | |
|---|---|---|
| 844,020 | Hoffman | Feb. 12, 1907 |
| 1,814,677 | Fennema | July 14, 1931 |
| 1,906,151 | Goodman | Apr. 25, 1933 |
| 2,309,429 | Ahern | Jan. 26, 1943 |
| 2,311,196 | Ahern | Feb. 16, 1943 |
| 2,311,197 | Ahern | Feb. 16, 1943 |
| 2,588,188 | Weisman | Mar. 4, 1952 |
| 2,678,666 | Theis | May 18, 1954 |
| 2,753,876 | Kurt | July 10, 1956 |